United States Patent [19]

Cohn et al.

[11] Patent Number: 4,990,761

[45] Date of Patent: Feb. 5, 1991

[54] PLURAL ARC RADIATION PROTECTOR

[75] Inventors: David B. Cohn, Torrance; Michael P. Hasselbeck, Redondo Beach; Gregory R. Sasaki, Long Beach, all of Calif.

[73] Assignee: Hughes Aircraft Company, Los Angeles, Calif.

[21] Appl. No.: 277,814

[22] Filed: Nov. 30, 1988

[51] Int. Cl.⁵ ............................................... G01J 1/20
[52] U.S. Cl. .................................. 250/202.1; 350/356
[58] Field of Search ................... 350/355, 356, 357; 372/11, 55, 86; 250/216, 239, 215, 201

[56] References Cited

U.S. PATENT DOCUMENTS

| 4,380,079 | 4/1983 | Cohn et al. | 372/86 |
| 4,826,295 | 5/1989 | Burt | 350/355 |

Primary Examiner—David C. Nelms
Attorney, Agent, or Firm—William J. Streeter; Wanda K. Denson-Low

[57] ABSTRACT

A radiation protection system is operative within an optical section of a radiation imaging system for protection of an array of detectors of the radiation. The protection system is formed of one or more spark boards arranged in series along a path of radiation propagation, the spark boards having a central window through which the radiation propagates. On a front side of each spark board are arranged a set of electrodes disposed about a periphery of the window. Ground pads are disposed on a back side of each board in registration with the electrodes on the front side to form therewith a set of capacitors. A capacitive-discharge power-supply circuit is connected to a first pair of electrodes in a first one of said boards. In the presence of excessive incident radiation power, a capacitor of the power supply circuit is switched to apply a high voltage across said first pair of electrodes, the voltage being high enough to initiate an arc across the window in said first board. The capacitors and electrodes are connected serially to allow a current of one arc to charge a succeeding capacitor which, upon being charged, initiates a further arc in a process which continues until all arcs have been struck. The array of arcs blocks radiation so as to protect the detectors.

9 Claims, 4 Drawing Sheets

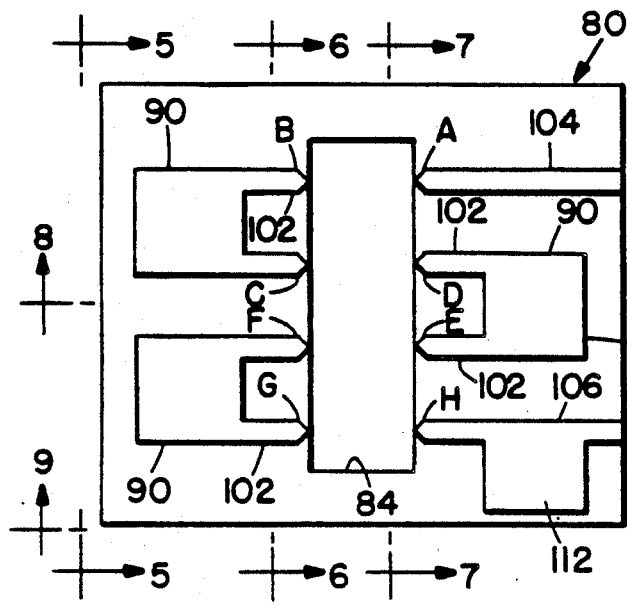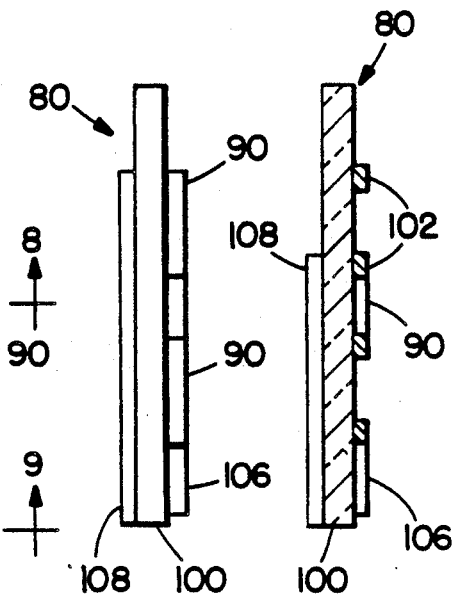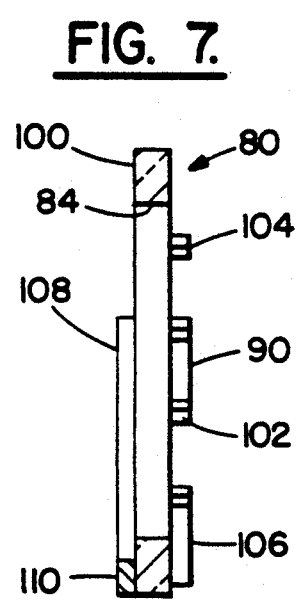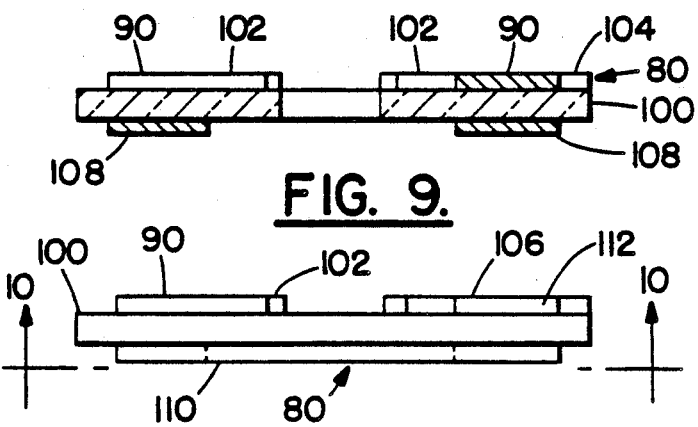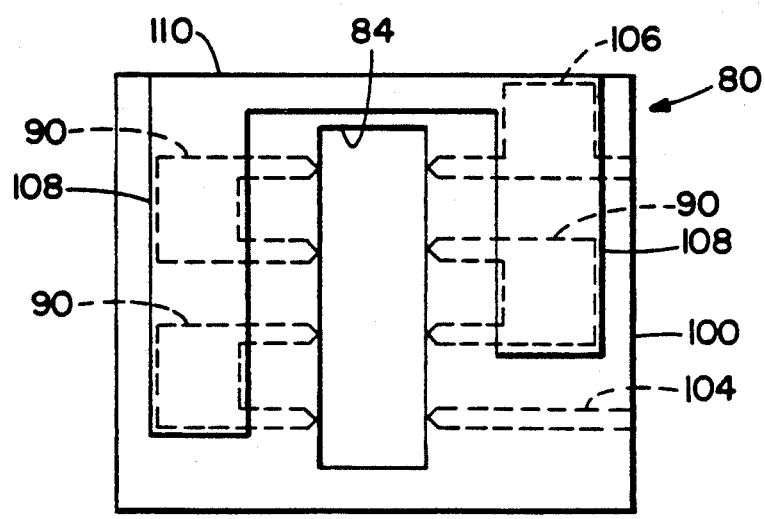

PLURAL ARC RADIATION PROTECTOR

BACKGROUND OF THE INVENTION

This invention relates to the protection of laser receiving devices from damage by an incident beam of radiation of excessive intensity and, more particularly, to a protection system employing a plurality of electric arcs disposed across a path of incident radiation and electrically energized in series from a single power source.

Radiation receiving devices are employed in a variety of situations. Of particular interest are receiving devices employed in the imaging of scenes emitting radiation such as infrared radiation An infrared imaging system employs, typically, an array of radiation sensitive detectors which view incoming radiation via an optical focusing system including a scanning mirror The detectors output signals in response to the incident radiation, the detector signals being employed by well-known signal processing circuitry to produce an image of the scene upon a display for viewing by persons operating the infrared imaging system.

Radiation detectors, of the type employed in an array of many detectors may be fabricated of semiconductor material which is susceptible to damage, as by heating, when exposed to excessively strong radiation. For example, a laser beam which might be directed inadvertently or deliberately toward the receiving optics of an imaging system could inflict significant damage to the radiation detectors so as to disable the detectors.

Such detectors, or sensors of radiation, are found in laser rangefinders, radars, and passive receiving systems such as the aforementioned imaging system. The receiving systems employ receiving telescopes which may have a relatively large field of view and a large acceptance angle through which laser radiation may be received. In the case of an active device, such as a laser rangefinder, it is intended that the receiving telescope receive laser radiation. However, in the case of a passive infrared imaging system, it is intended that only scene radiation be incident upon the receiving telescope even though the telescope is responsive to laser radiation at the infrared frequencies.

The laser radiation can be at a variety of wavelengths, and may be pulsed or continuous wave. In order to protect a receiving device from excessively strong laser radiation, a fast-operating optical switch is desired to close the optical path in the presence of the strong radiation, which switch must allow the normal intensity radiation to pass without interference through the optical system to the detectors. Such an optical switch must be activated almost instantaneously prior to the damaging of the detectors, to block or greatly reduce the transmission of strong laser radiation. Ideally, such an optical switch should protect against a broad band of laser wavelengths, and be operative over a wide field of view.

One type of switch which has been shown to offer protection from excessively strong radiation is the plasma arc switch. An understanding of the operation of a plasma arc in blocking a path of laser radiation is explained in U.S. Pat. No. 3,964,003 issued in the name of Cohn et al on June 15, 1976, and U.S. Pat. No. 4,380,079 issued in the name of Cohn et al on Apr. 12, 1983.

High density plasma can interact with radiation by refraction, reflection and absorption. The use of this effect to divert laser radiation for purposes of pulse shaping and power limiting has been demonstrated in the first of the foregoing patents. For example, radiation from a 5 micron wavelength carbon monoxide laser can be diverted by a short pulse plasma arc placed at a beam focal spot. The use of intense-localized, high current arcs is required in order to reach the plasma densities necessary to divert or absorb laser radiation.

A problem arises in the use of a plasma arc switch due to the use of relatively large fields of view in radiation receiving equipment. The large fields of view would require an array of many electric arcs through plasma, rather than a single arc. Heretofore, the generation of numerous arcs would require numerous sources of power and difficulty in connecting the power sources to the sites of the various arcs without interference with the optical transmission properties of a receiving telescope. In addition, the use of multiple power sources may present a problem of synchronization of the arcs such that all arcs are generated in time to protect the detectors. By way of example, it is envisioned that a number of arcs, on the order of 10-20 arcs would be required in a typical system. Such a number of arcs would require, heretofore, an excessively large number of power cables, enlarged total amount of power, and would entail electromagnetic interference generated by the various currents applied to the arcs. As a consequence of such a complex arrangement, system efficiency, system size, and compatibility with sensor electronics would be significantly compromised resulting in a system which could not be employed effectively in situations requiring minimum size and high performance as in an airborne or satellite imaging system.

SUMMARY OF THE INVENTION

The foregoing problem is overcome and other advantages are provided by a receiving system, such as an infrared imaging system having an array of radiation detectors and an optical system for directing radiation from a scene to the array of detectors; and wherein, in accordance with the invention, a radiation protection system providing an array of electrically generated arcs in a plasma is installed within the optical system.

The radiation protection system comprises electrodes constructed on one or more electrically insulating plates disposed transversely on a path of radiation propagation, and having windows through which the radiation propagates. Spark electrodes are arranged serially on one side of each plate, and on both sides of the window in a plate for directing sparks transversely across the window. Ground pads are placed on the back side of each plate, opposite the spark electrodes to form with the spark electrodes a series of capacitors. During the flow of arc current through plasma at the various electrodes, the plasma provides a low impedance path for discharge of the capacitors, this readying the capacitors for a further set of arcs. Any remnant charge is discharged through resistance of the plate material. The plate material also has, preferably, a dielectric constant of sufficient value to select a desired amount of capacitance between each electrode and a ground pad.

The protection system further comprises a direct current (DC) power supply which is triggered by a sensor of incoming radiation to apply power to the series of capacitors. Electrical circuitry connected to the sensor establishes a threshold against which incoming radiation power is compared to establish a suitable value for triggering the pulsed power supply. The power supply feeds pulsed power to the first capacitor in the series of capacitors at a voltage sufficiently high to strike an arc between the first two electrodes. The plates are mounted within a chamber filled with a gas, such as neon, suitable for development of a plasma through which electric current of the arc flows between a pair of the electrodes. As the current flows into the first capacitor, the first capacitor charges to a voltage which initiates an arc between the next two electrodes resulting in a charging of the next capacitor. In this way, arc after arc are initiated sequentially until current from the power supply is flowing simultaneously through all of the arcs to provide an array of concurrent arcs disposed transversely of the radiation path. The arcs interact with the incoming radiation to prevent the radiation from reaching the array of detectors. By using a set of the plates, each with its own set of spark electrodes, the locations of the arcs produced at each of the plates may be staggered relative to the locations of arcs at the other plates to insure that all portions of the propagation path are intercepted by the arcs, thereby to insure that essentially no radiation reaches the array of detectors. In a preferred embodiment of the invention, the power supply includes a capacitor which is charged with energy suitable for maintaining the arcs over an interval of time long enough to activate a further protection device such as a mechanical shutter.

BRIEF DESCRIPTION OF THE DRAWING

The aforementioned aspects and other features of the invention are explained in the following description, taken in connection with the accompanying drawing wherein:

FIG. 4 is a plan of a spark board of FIG. 2;

FIG. 5 is a side view of the spark board taken along the line 5—5 of FIG. 4;

FIG. 6 is a sectional view of the spark board taken along the line 6—6 in FIG. 4;

FIG. 7 is a sectional view of the spark board taken along the line 7—7 in FIG. 4;

FIG. 8 is a sectional view of the spark board taken along the line 8—8 in FIG. 4;

FIG. 9 is an end view of the spark board taken along the line 9—9 in FIG. 4;

FIG. 10 is a view of a back side of the spark board taken along the line 10—10 in FIG. 9;

DETAILED DESCRIPTION

Figure 1:
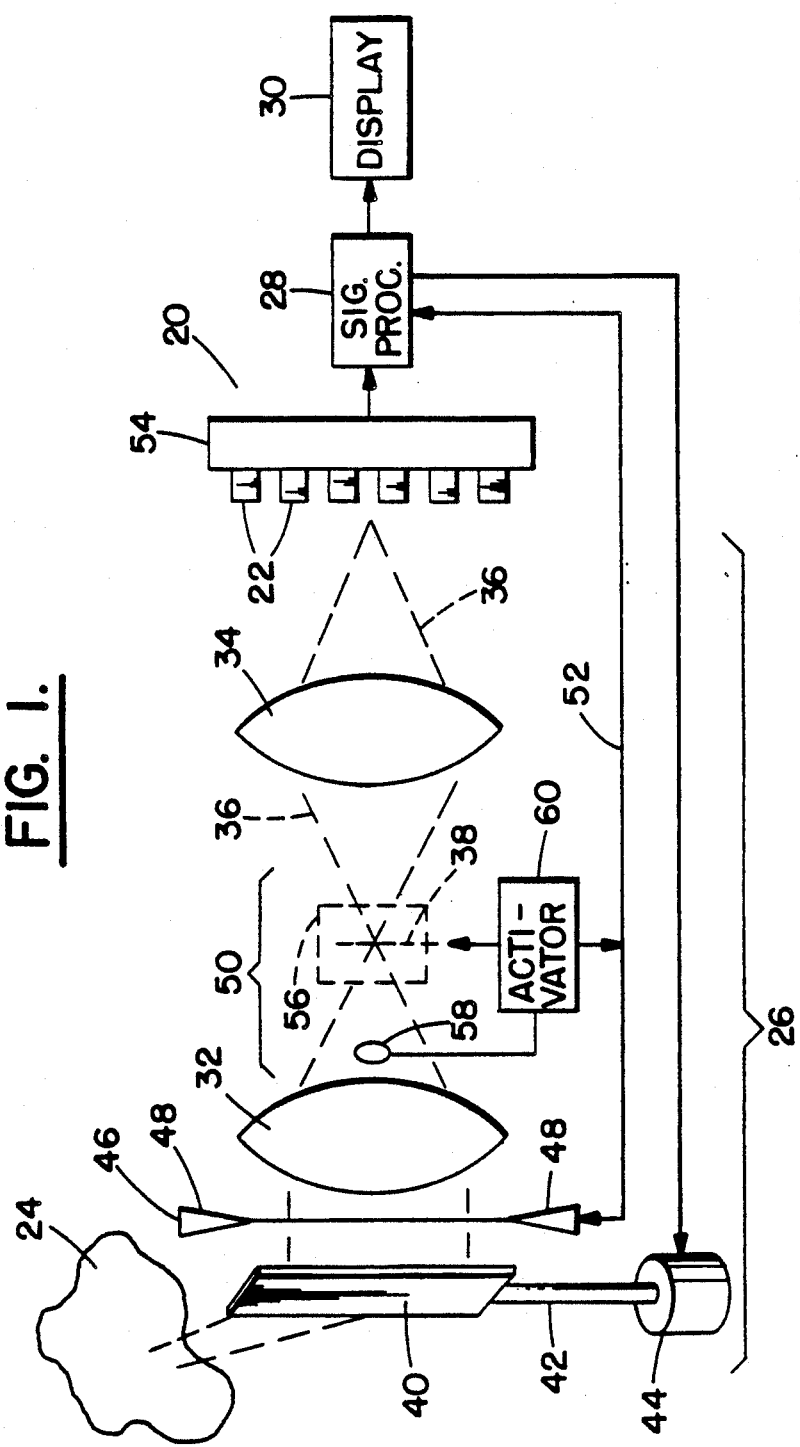
FIG. 1 is a diagrammatic view of an imaging system incorporating a radiation protection system according to the invention.

In FIG. 1, there is shown an imaging system 20 including an array of detectors 22 for detecting radiation, such as infrared radiation emanating from a scene 24 and directed by an optical system 26 from the scene 24 to the detectors 22. The detectors may be arranged in a linear array or in an array composed of a matrix of rows and columns. The detectors 22 output electric signals to a signal processor 28, in response to radiation incident upon detectors 22, the processor 28 employing well known circuitry for converting the detector signals into an image of the scene 24. The image is presented on a display 30 connected to an output terminal of the processor 28.

By way of example, the optical system 26 comprises a first lens 32 and a second lens 34 for focusing rays 36 of the radiation emanating from the scene 24 upon the detectors 22. Typically, the detectors 22 are arranged along a planar surface, the lenses 32 and 34 producing a real image of the scene 24 upon the planar surface of the detectors 32. In addition, the first lens 32 produces an intermediate real image at a focal plane 38 between the two lenses 32 and 34, the rays 36 continuing through the focal plane 38 to be reimaged by the second lens 34 upon the planar surface of the detectors 32.

A scanning of the scene 24 is provided by use of a mirror 40 rotatably mounted on a shaft 42, the shaft 42 connecting the mirror 40 to a rotator 44 which rotates the mirror 40 in response to electric drive signals applied to the rotator 44 by the signal processor 28. By activating the rotator 44 with signals provided by the processor 28, rotation of the mirror 40 is synchronized to signal processing operations performed by the processor 28. Rays 36 propagating from the scene 24 are reflected by the mirror 40 to pass through the lenses 32 and 34. A protective mechanical shutter 46 having blades 48 may be deployed in front of the first lens 32 to block incident radiation having excessively high power so as to protect the detectors 22 from a possibility of damage by excessively powerful radiation.

In accordance with the invention, the system 20 is provided with a radiation protection system 50 which is located within the optical system 26. The protection system 50 is to be deployed along a path of propagation of the radiation rays 36, so as to be responsive to the intensity of the radiation, and so as to intercept the radiation to protect the detectors 22. An output signal of the protection system 50 is applied via line 52 to the shutter 46 for closing the blades 48, thereby to shield the detectors 22 from the damaging effects of excessively powerful radiation.

For the detection of infrared radiation, the detectors 22 may be mounted within a cryogenic chamber (not shown) for cooling and maintaining the detectors 22 at a suitably low temperature for their operation. The portrayal of the system 20 in FIG. 1 has been simplified to show only those components of the system 20 necessary for an understanding of the invention. Accordingly, the detectors 22 are shown simply as being mounted on a support 54, which support lies along the planar surface, and includes electrical conductors, and/or well-known multiplexing circuitry (not shown) for connecting the signals of respective ones of the detectors 22 to the signal processor 28.

The protection system 50 includes a spark chamber 56, a sensor 58 of the radiation, and an activator 60 connected to the sensor 58 for activating the chamber 56 to produce plasma arcs which block the propagation of the radiation from the detectors 22. An output signal of the activator 60 is applied via line 52 to operate the shutter 46. The mechanical shutter 46, or a further mechanical shutter (not shown), may be placed along side the spark chamber 56 so as to beam at or nearly at a focus of the beam of radiation, thereby to minimize the amount of travel of the shutter blades required to obscure incoming radiation. This minimizes shutter response time As an example of a mechanical shutter which may be placed at or near the focus, the total distance which each of the shutter blades need move, in the manner of the blade of a scissors, is in the submillimeter range. A rapid-action shutter may be constructed by use of a piezoelectric material in conjunction with mechanical leverage for mechanical advantage to advance the blades rapidly. The requisite motion of the blades for stopping the radiation can occur in the very small time frame of ten microseconds, which activation interval is faster than the duration of a protection interval of the plasma. Thereby, protection can be provided by the mechanical shutter before conclusion of the protection provided by the plasma, so as to have a continuum of protection once the plasma arcs have been struck.

Figure 3:
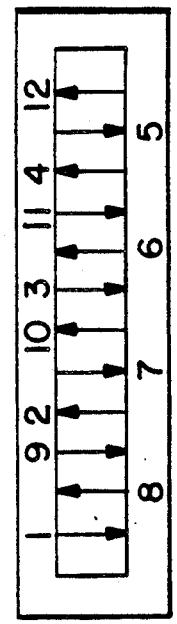
FIG. 3 is a schematic view, taken through windows of spark boards of the radiation protection system of FIG. 2 showing an array of electric arcs through plasma, the arcs being staggered by a staggering in the positions of the spark boards.
Figure 2:
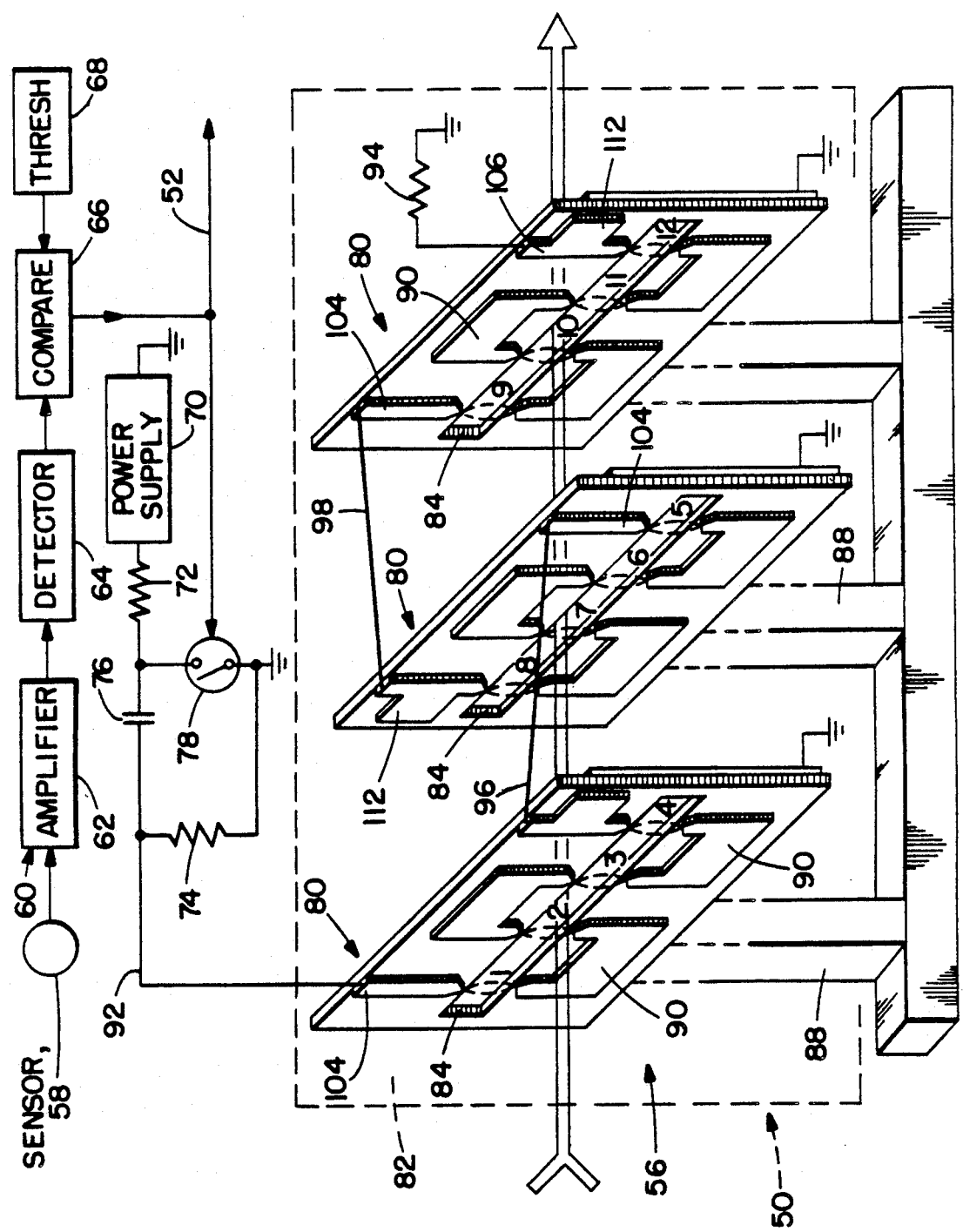
FIG. 2 is a schematic drawing of the radiation protection system of FIG. 1.

With reference also to FIGS. 2 and 3, there are shown details in the construction of the protection system 50. The activator 60 comprises an electric circuit which includes an amplifier 62, a detector 64, a comparator 66, a source 68 of the threshold voltage, a power supply 70, resistors 72 and 74, a capacitor 76, and a switch 78. The spark chamber 56 comprises a set of spark boards 80 disposed within an ionizable gas, preferably one of the rare gases, such as neon, argon, xenon, and helium enclosed within the walls 82 of the chamber 56. The walls 82 are transparent to the radiation so as to allow propagation of the rays 36, represented by an arrow in FIG. 2, through the chamber 56. The chamber 56 is located at the site of the focal plane 38 because, as shown in FIG. the rays 36 occupy a minimum volume at the plane 38 due to the convergence and focusing of the rays by the first lens 32. Each of the spark boards 80 is provided with a central window 84 which is formed as a clear aperture within a spark board 80, the boards 80 being arranged so as to allow propagation of the rays 36 through the respective windows 84. The boards 80 are positioned in alignment with each other upon a base 86 having legs 88 which grip the boards 80 by conventional means (not shown).

The boards 80 are provided with electrodes 90 for the generation of electric arcs through a plasma of ionized gas in directions transverse to the long dimension of each window 84. The windows 84 are elongated in a plane of scanning of the mirror 40 so as to allow for transverse movement of the rays 36 upon a scanning of the scene 24 by the mirror 40. The boards 80 are staggered in position so as to provide for an interlacing of arcs produced by respective ones of the electrodes 90, thereby to cover the complete region of a scanning path of radiation produced by rotation of the mirror 40. The interlaced pattern of arcs is shown in a schematic representation of a composite window in FIG. 3 wherein individual ones of the arcs are numbered to correspond with numerical identification of the arcs set forth in FIG. 2.

In operation, the sensor 58 outputs an electric signal in response to radiation incident upon the sensor 58. The output signal of the sensor 58 is coupled via the amplifier 62 to the detector 64, the amplifier 62 amplifying the signal to a suitable power level for detection by the detector 64. The comparator 66 compares the signal, as detected by the detector 64, with a reference signal provided by the threshold source 68 to output a signal on line 52. The signal upon line 52 has a logic state of zero when the radiation incident upon the sensor 58 has a suitable power level, the signal on line 52 changing to a value of logic-1 when the signal outputted by the detector 64 exceeds the reference signal outputted by the threshold source 68. A logic-1 signal on line 52 indicates that the incident radiation is excessively powerful and may damage the array of detectors 22.

The power supply 70 is a DC supply providing a sufficiently high voltage to the capacitor 76 for initiating electric sparks across the windows 84 between the electrodes 90. The power supply 70 may incorporate a well-known circuit for the generation of voltage having a suitably high value. One terminal of the supply 70 is connected to ground, and the other terminal outputs the voltage via the resistor 72 to the capacitor 76. A connecting node between the resistor 72 and the capacitor 76 is connected by the switch 78 to ground. The resistor 74 grounds the terminal of the capacitor 76 opposite the capacitor terminal coupled to the switch 78 to allow the capacitor to charge. Line 92 connecting to the junction of the capacitor 76 and the resistor 74 serves to connect voltage to the array of boards in the chamber 56. The boards 80 are electrically connected in series between the line 92 and ground by a resistor 94 and conductors 96 and 98 which interconnect the boards 80.

By way of example, the resistor 94 has a relatively small value, on the order of 0.1 ohms, in view of the relatively large current, approximately 2,000 amperes which flows through the plasma during the presence of the arcs. The magnitude of the resistor 94 may be adjusted to select a desired duration of the plasma arcs. Operation of the switch 78 to ground the connecting node between the capacitor 76 and the resistor 72 places the voltage of the capacitor 76 across the first pair of electrodes to initiate a plasma discharge. The comparator logic-1 signal on line 52 is employed to operate the switch 78 to ground the node between the capacitor 76 and the resistor 72. The comparator logic-1 signal on line 52, as noted hereinabove, also activates the shutter 46, and furthermore is employed to signal the processor 28 that no more imaging data is being presented.

FIGS. 4–10 show details in the construction of a spark board 80. At least one spark board 80 is to be employed in the construction of the spark chamber 56. Preferably a plurality of spark boards 80 such as the three boards disclosed in FIG. 2 should be employed in the construction of the spark chamber 56. Each of the spark boards 80 has the same construction, the construction of one of these boards being shown in FIGS. 4–10.

A spark board 80 comprises a plate 100 of dielectric material, the plate 100 being formed with a central rectangular aperture which constitutes the window 84. The electrodes 90 are disposed on a front side of the plate 100, and include fingers 102 which extend outward from a central body portion of each electrode 90 to the periphery of the window 84. An input electrode 104 and an output electrode 106 are also provided on the front side of the plate 100. A ground pad 108 is provided on a backside of the plate 100 in registration with the electrodes 90. As shown in FIG. 10, the pad 108 has two broad sections disposed in opposite sides of the window 84 joined by a connecting section 110 which passes alongside one end of the window 84. Also shown in FIG. 10, in phantom view, are outlines of the electrodes 90, 104 and 106. The locating of electrodes 90 above the ground pad 108 and spaced apart from the ground pad 108 by the dielectric material of the plate 00 forms a series of capacitors in which, in each of the capacitors, an electrode 90 serves as one capacitor plate and the pad 108 serves as the opposite capacitor plate. A portion of the output electrode 106 is enlarged at 112 to form a further capacitor in conjunction with the pad 108, the capacitor of the electrode 106 being useful in the interconnection of one spark board 80 to a successive spark board 80 as shown in FIG. 2. The capacitor associated with the enlarged portion 112 of the electrode 106 serves to provide electrical characteristics between electrodes of two successive boards 80 which are identical to the electrical characteristics of two successive electrodes on a single board 80.

In the construction of a spark board 80, the plate 100 has a thickness of approximately one millimeter. The electrodes 90, 104, and 106 are fabricated of a metal, such as copper, which is readily deposited on the dielectric material of the slab 100. Typically, in the construction of the board 80, both front and back sides of the plate 100 are clad with copper foil, and then the electrodes and the ground pad are etched. If desired, tungsten tips may be provided at the ends of the fingers 102 and at the ends of the electrodes 104 and 106 facing the window 84.

Figure 11:
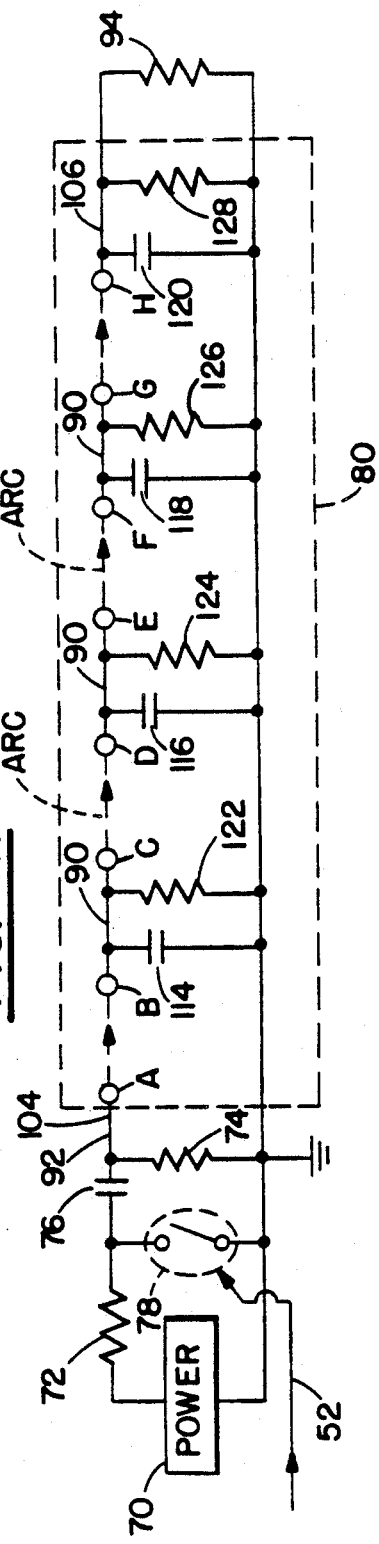
FIG. 11 is an electrical schematic diagram of a spark board of FIG. 2 including electrical connection to a power supply.
Figure 12:
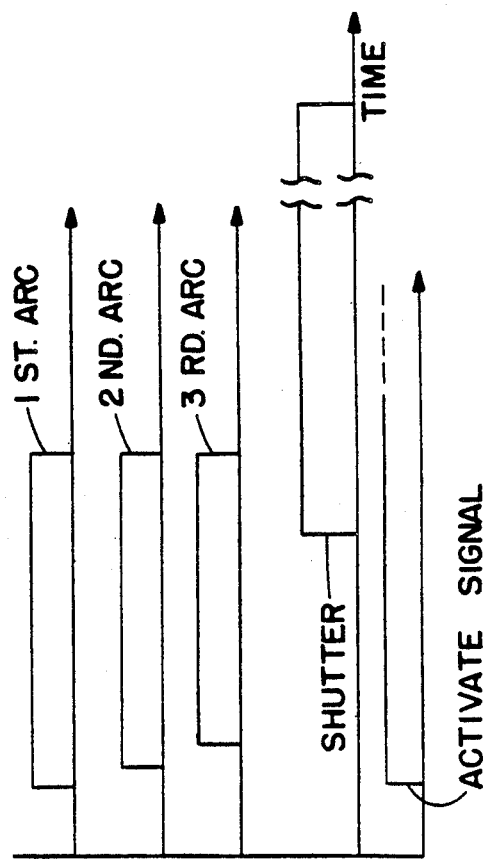
FIG. 12 is a timing diagram showing times of occurrence of successive plasma arcs in a spark chamber of the invention, the diagram also showing the time of effective operation of a protective shutter employed in the system of FIG. 1.

With reference also to FIGS. 11 and 12, the electrical operation of the spark chamber 56 is explained further. The capacitors formed on a single board 80 by the three electrodes 90 and by the enlarged portion 112 of the electrode 104 are represented in FIG. 11 by the four capacitors 114, 116, 118, and 120. The material of the plate 100 is essentially electrically insulating, but does have a minimal resistance sufficient to discharge the capacitors 114–120, this resistance being represented in FIG. 11 by the resistors 122, 124, 126, and 128. By way of example, each of the resistors 122-128 may have a value of at least one megohm which, in cooperation with the capacitance approximately 20 picofarads, results in a discharge time on the order of a few microseconds for remnant charge. This discharge, in combination with the discharge provided by the plasma arcs, ensures that the capacitors are operative to allow for a relatively high repetition frequency of the plasma arcs. For example, in a preferred embodiment of the invention, the arcs can be regenerated at a rate of several hundred repetitions per second. If desired, the material of the plate 100 may be impregnated with carbon particles to provide a desired value for the resistances 122–128 or, alternatively, the resistors 122-128 can be fabricated as discrete resistors (not shown) mounted on the plate 100. No carbon particles have been employed in the preferred embodiment of the invention, the intrinsic resistance of the material of the plate 100, in cooperation with the discharge provided by the arcs, has been found sufficient for rapid discharge of the capacitors 114–120. The plate 100 may be fabricated of a blend of fibrous glass with a plastic binder such as epoxy or Teflon, or may be fabricated of a ceramic such as alumina.

Initially, in the operation of the circuit of FIG. 11, the switch 78 is opened so that the power supply 70 can charge the capacitor 76 by applying current to the capacitor 76 via the resistors 72 and 74. Upon the generation of the activation signal on line 52, the switch 78 closes (the position shown in FIG. 1) to apply the full value of voltage of the charged capacitor 76 across the arc electrodes A and B. The resistor 72 has a sufficient value of resistance to prevent surge currents through the switch 78. The value of resistance of the resistor 74 is selected large enough so as to avoid large currents to ground, thereby shorting the capacitor 76, but small enough so as to avoid an unduly long charging time of the capacitor 76. For example, a discharge time, proportional to the product of the capacitance of the capacitor 76 and the resistance of the resistor 74, of a few milliseconds or longer, is adequate.

Immediately after the closure of switch 78, there is a large difference of potential between circuit points A and B in FIG. 11 because the capacitor 114 is fully discharged by action of plasma arc and by action of the resistor 122. For ease of reference, the legends A and B are also shown in FIG. 4. As a result of the large difference of the potential, an arc is initiated between the circuit points A and B. Current flows through the arc to charge the capacitor 114 resulting in a build-up of voltage across the capacitor 114. There results a large difference of potential between circuit points C and D because the capacitor 116 has been discharged by the resistor 124. As the capacitor 114 continues to charge, the voltage between points C and D becomes large enough to initiate an arc between the points C and D. This results in a charging of the capacitor 116 followed by the generation of an arc between circuit points E and F. The arc between circuit points E and F results in a charging of the capacitor 118 followed by the generation of an arc between circuit points G and H. The current in the arc between circuit points G and H charges the capacitor 120 and, after a charging of the capacitor 120, continues to flow to ground via the resistor 94.

In the event that two spark boards 80 are connected in series, rather than the single board 80 depicted in FIG. 11, then, upon a charging of the capacitor 120, an arc is initiated in the second board 80, and no current flows through the resistor 94 until all four arcs have been initiated in the second board. In the event that three spark boards 80 are connected in series, as shown in FIG. 2, then, after initiation of the four arcs in the second board 80, the first arc is initiated in the third board. No current flows in the resistor 94 until after a generation of the four arcs in the third board.

The successive initiation of the arcs, one after the other, is shown in the timing diagram of FIG. 12. The timing diagram shows the generation of the first three arcs in the spark chamber 56, the arcs being generated in response to the activation signal which is shown in the bottom trace of the timing diagram. The diagram shows the delay, on the order of one nanosecond, in initiation of the second arc relative to initiation of the first arc, and a delay of approximately the same magnitude in initiation of the third arc relative to the initiation of the second arc. As described in FIG. 11, after the charging of all of the capacitors 114–120, current continues to flow via the resistor 94, which current continuously discharges the capacitor 76.

This current and all of the arcs terminate when the capacitor 76 has discharged to a voltage level which is too low to maintain the arcs. The termination of the arc is shown in the diagram of FIG. 12. The activation signal on line 52 (FIGS. 1 and 2) is applied also to the shutter 46, as has been described hereinabove. However, the shutter 46 is a mechanical device which operates much more slowly than the electrical generation of the arcs. As a result, the shutter 46 does not begin effective operation to block the unwanted radiation until after the arcs have been initiated. The duration of the arcs is sufficient to cover the delay in operation of the shutter from the leading edge of the activation signal. Thereby, there is continuous protection of the detectors 22 (FIG. 1) beginning with the time of initiation of the captivated signal.

In the operation of the invention, with respect to the generation of the plasma arcs, it is noted that the series of arcs introduce ionized paths at each of the electrode pairs, A-B, C-D, E-F, and G-H (FIG. 11) having sufficiently high conductance that the voltage drop across each arc is believed to be no more than approximately 10 volts. This provides for a very effective discharge of the capacitors leaving no more than a very small value for the above-noted remnant charge. In the construction of the preferred embodiment of the invention, the voltage at the power supply capacitor 76 is in the range of 10-20 kilovolts. The capacitance of the power supply capacitor 76 is 56 nanaofarads.

When the arcs are first initiated, the time delay from initiation of one arc to the initiation of the next arc, as noted above, is approximately one nanosecond. After completion of the last arc, all of the arcs are in existence simultaneously to present a sheet of arcs. The sheet of arcs may exist for an interval in the range of 5-10 microseconds, after which the sheet of arcs is extinguished. However, ionized particles remain in each of the arcs for a further interval of time which extends the presence of the ionized particles to a total of approximately 20 microseconds, possibly even longer. During this interval of time, the ionized particles are effective to reflect incident radiation. Since, as noted above, a mechanical shutter can be activated within an interval of 10 microseconds, the plasma of the arcs maintains its radiation reflection characteristic for a sufficiently long interval of time to overlap the beginning of the protection interval of the mechanical shutter. This provides for the continuous protection, which protection begins with the initiation of the arcs.

Figure 13:
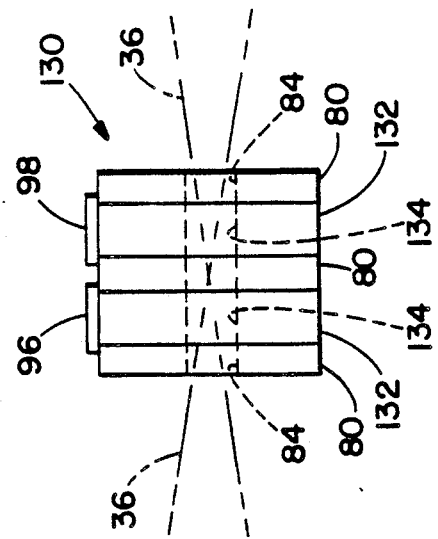
FIG. 13 shows a compact stratified construction of a set of spark boards in the spark chamber of the invention.

FIG. 13 shows a preferred embodiment in the construction of the spark chamber 56 (FIG. 2) wherein the three spark boards 80 are supported within a monolithic structure instead of the separate supports provided by the base 86 and legs 88 of FIG. 2. The support shown in FIG. 2 is convenient for demonstrating operation of the invention; however, to facilitate manufacture, and to provide a compact structure to the spark chamber 56, the multi-layered structure 130 of FIG. 13 is preferred. The three spark boards 80 are separated by two layers 132 of electrically insulating material, which material may be the same as that employed in the construction of the plates 100 of the boards 80. Each of the layers 132 is provided with a window 134, the windows 134 enveloping the optical path, as do the windows 84, so as to provide a propagation path for the radiation rays 36 through the structure 130. The conductors 96 and 98 (FIG. 2) are readily fabricated in the structure 130 as short conducting strips which bridge over respective ones of the layers 132. As a convenience in constructing the conductors 96 and 98, the spark board 80 in the middle of the structure 130 may be formed as the mirror image of the other two spark boards 80, this arrangement minimizing the lengths of the conductors 96 and 98. The configuration with the mirror arrangement in the construction of the middle board 80 is shown in FIG. 2 in which the positions of the input electrodes 104 are reversed, and similarly, the positions of the output electrodes 106 are reversed.

The plasma arcs employed in the invention are operative to block radiation over a broad band of wavelengths. The arrangement of the arcs, as viewed from an entry to the structure 130 (FIGS. 13 and 3), provides complete coverage over a wide field of view. In the plasma arcs, electrons induce a variation in the index of refraction of the gas which results in refraction, reflection, or absorption of laser radiation. For complete reflection, the plasma electron density should be sufficiently high so that the plasma frequency exceeds the incident frequency of the laser radiation. This is attained in the invention by the use of intense plasma arcs to achieve the desired plasma density, such plasma density being disclosed in the aforementioned U.S. Pat. No. 3,964,003. By way of example in the construction of the invention, the capacitor 76 (FIG. 11) may be charged to a voltage of 25,000 volts, and may have a storage capacitance of 5 nF (nanofarad). Rise times in the generation of the arcs may be on the order of 5-10 nS (nanosecond).

It is to be understood that the above described embodiment of the invention is illustrative only, and that modifications thereof may occur to those skilled in the art. Accordingly, this invention is not to be regarded as limited to the embodiment disclosed herein, but is to be limited only as defined by the appended claims.

What is claimed is:

1. In a receiving system including means for detecting radiation and means for directing rays of radiation along a path from a scene being viewed by the receiving system toward the detecting means, a radiation protection system disposed on said path, said radiation protection system comprising:
    an electrode assembly with electrodes disposed about said radiation path, said electrodes being arranged for generation of electric discharge arcs directed across said path;
    power means having an output terminal and a return terminal for supplying a voltage of sufficient magnitude to generate arcs between pairs of said electrodes, said electrodes being arranged in series between the output terminal and the return terminal of said power means;
    a set of capacitors, individual ones of the electrodes being connected by respective ones of said capacitors to the return terminal of said power means;
    means for activating said power means to generate a first arc between a first pair of electrodes of said series of electrodes; and wherein
    a first of said capacitors connected to said first pair of electrodes is charged by electric current of said first arc to a potential of sufficient magnitude to strike a second arc between a second pair of electrodes of said series of electrodes, subsequent ones of said capacitors being charged sequentially by electric current in said arcs to initiate sequentially an array of arcs, said arcs blocking said radiation rays from reaching said detecting means.

2. A system according to claim 1 wherein said electrodes are mounted in an environment of a gas which develops plasma in the presence of electric arcs.

3. A system according to claim 2 wherein said electrode assembly comprises at least one spark board, said one spark board being disposed transversely of said radiation path and having a central window transparent to said radiation, said electrodes being located on a first side of said board, there being a ground pad disposed on a second side of said board opposite said first side and in registration with said electrodes to form with said electrodes a plurality of said capacitors, material of said board serving as a dielectric of said plurality of capacitors.

4. A system according to claim 3 wherein said power means includes an output capacitor and a power supply for charging said output capacitor to a voltage sufficient for initiating said arcs, said power means including a switch for disconnecting said output capacitor from said power supply and reconnecting said output capacitor in series with said first pair of electrodes to initiate said arcs.

5. A system according to claim 4 further comprising sensor means for sensing a power level of incident radiation, said sensor means activating the switch of said power means to initiate said arcs upon a sensing of excessive radiation power.

6. A system according to claim 5 wherein said system comprises a plurality of said spark boards, said spark boards being arranged serially along said optical path, each of said spark boards being oriented transversely to said path, the path passing through said windows of said spark boards; and wherein
    a last electrode in a series of electrodes on
    a first of said boards is connected to a
    first electrode in a series of electrodes on
    a second of said boards.

7. A system according to claim 6 wherein electrodes in one of said boards are staggered in position relative to electrodes in another of said boards about said radiation path.

8. A system according to claim 3 wherein said system comprises a plurality of said spark boards, said spark boards being arranged serially along said optical path, each of said spark boards being oriented transversely to said path, the path passing through said windows of said spark boards; and wherein
    a last electrode in a series of electrodes on a first of
      said boards is connected to a first electrode in a
      series of electrodes on a second of said boards.

9. A system according to claim 8 wherein electrodes in one of said boards are staggered in position relative to electrodes in another of said boards about said radiation path.

* * * * *